United States Patent [19]

Barnett

[11] Patent Number: 4,519,215
[45] Date of Patent: May 28, 1985

[54] TRANSPORT REFRIGERATION SYSTEM WITH TOP FREEZING AVOIDANCE

[75] Inventor: Joe R. Barnett, Minneapolis, Minn.

[73] Assignee: Thermo King Corporation, Minneapolis, Minn.

[21] Appl. No.: 579,930

[22] Filed: Feb. 14, 1984

[51] Int. Cl.³ .......................... G05D 23/19; F25B 1/00
[52] U.S. Cl. ........................................ 62/158; 62/208; 62/228.5; 62/229
[58] Field of Search .................. 62/158, 157, 231, 130, 62/126, 155, 234, 229, 208, 209, 203, 227, 239, 228.5; 236/78 D, 78 B, 94, 46 R, 46 F, 1 EA; 340/585, 588, 587, 584; 374/102, 103; 364/557

[56] References Cited

U.S. PATENT DOCUMENTS

| | | | |
|---|---|---|---|
| 2,589,031 | 3/1952 | Allyne | 62/186 |
| 2,923,384 | 2/1960 | Black | 62/239 |
| 2,937,510 | 5/1960 | Allyne | 62/186 |
| 3,443,121 | 5/1969 | Weisbrod | 236/46 F |
| 3,918,269 | 11/1975 | Summers et al. | 62/180 |
| 4,292,813 | 10/1981 | Paddock | 62/158 |
| 4,313,308 | 2/1982 | Boratgis et al. | 62/126 |

FOREIGN PATENT DOCUMENTS 160709  10/1982  Japan .......................... 62/239

Primary Examiner—Harry Tanner
Attorney, Agent, or Firm—E. C. Arenz

[57] ABSTRACT

To reduce the probability of top freezing of a fresh cargo 12 in a trailer 10 served by a transport refrigeration unit 14, a control arrangement is provided including a sensor 18 controlling signals according to discharge air temperature fed to a first timer 20 which provides time periods according to the level of discharge air temperature, with shorter duration periods with lower discharge air temperatures, and when timer 20 times out effects actuation of relay 22 to reduce refrigerating capacity and start a duration timer 26 to maintain the reduced refrigeration capacity, with timer 26 functioning through a reset 28 to again start timer 20 when the duration timer has expired, and has caused the relay 22 to be operated to a position of normal refrigerating capacity.

3 Claims, 4 Drawing Figures

TRANSPORT REFRIGERATION SYSTEM WITH TOP FREEZING AVOIDANCE

CROSS-REFERENCE TO RELATED APPLICATION

Hanson U.S. patent application Ser. No. 579,428, filed contemporaneously herewith, is a related application.

BACKGROUND OF THE INVENTION

This invention pertains to the art of a transport refrigeration system provided with control apparatus for reducing the probability of top freezing of fresh perishable cargo adjacent the path of refrigerated air discharged from the transport refrigeration unit.

In a trailer or truck hauling perishable food products, a part loss of the cargo occasionally occurs due to freezing the top of the load near the area where the cold air is blown out of the refrigeration unit. Typical practice in the art is to measure only the return air temperature at the inlet to the transport refrigeration unit without regard to the temperature of the air being blown out over the cargo. Thus, while the set point temperature of the unit might be of a value which would indicate top freezing should not occur, the actual temperature of the air being discharged from the unit may be at a significantly lower temperature than the set point temperature.

It is the aim of this invention to provide a control arrangement for reducing the likelihood of top freezing for a transport refrigeration unit of a character having a normal refrigerating capacity in one mode of operation and a reduced refrigerating capacity in another mode.

SUMMARY OF THE INVENTION

In accordance with the invention, the control includes means for sensing the temperature of the discharge air from the unit and providing a signal reflecting the temperature, timing means actuated by the signal and operable, in response to said signal indicating a discharge temperature below a predetermined temperature capable of causing top freezing after a given period, to provide time periods of progressively shorter duration, with progressively lower sensed temperatures of operation of said unit in said normal capacity mode, and means responsive to the expiration of any of said time periods to shift said unit to said reduced capacity mode.

DESCRIPTION OF THE PREFERRED EMBODIMENT

Figure 1:
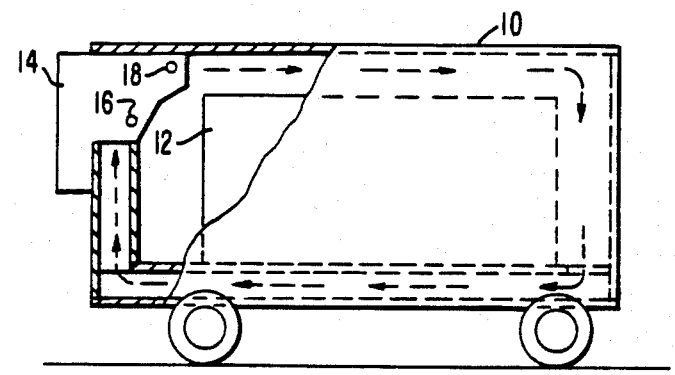
FIG. 1 is a generally diagrammatic side view of a trailer provided with a transport refrigeration unit to illustrate the top freezing problem.

In FIG. 1 a trailer 10 of the type adapted for carrying perishable loads as indicated at 12 is provided with transport refrigeration unit 14 of the type as disclosed in U.S. Pat. No. 4,325,224, for example, and having the capability of operating at what is herein called a normal refrigerating capacity in one mode of operation, and at a reduced refrigerating capacity in another mode. While a reduction in refrigerating capacity can be accomplished in various ways, such as changing the speed of the engine driving the compressor, the description will proceed with what is currently considered to be the preferred form, which is unloading the compressor. Of course, it is also within the contemplation of the invention that the reduction in refrigerating capacity can be obtained by going to a null or an engine shutdown, to eliminate the refrigerating capacity.

The typical air flow through the trailer and around the load is indicated by the directional arrows which shows the air discharged passing across the top of the load 12 and then returning through various paths and back up to the inlet of the evaporator part of the unit 14. The symbol 16 in the return air inlet of the unit indicates the return air thermostat which controls the unit operation in accordance with a particular set point temperature. The symbol 18 in the discharge outlet of the unit indicates the discharge air temperature sensor which is used in connection with the invention.

Figure 2:
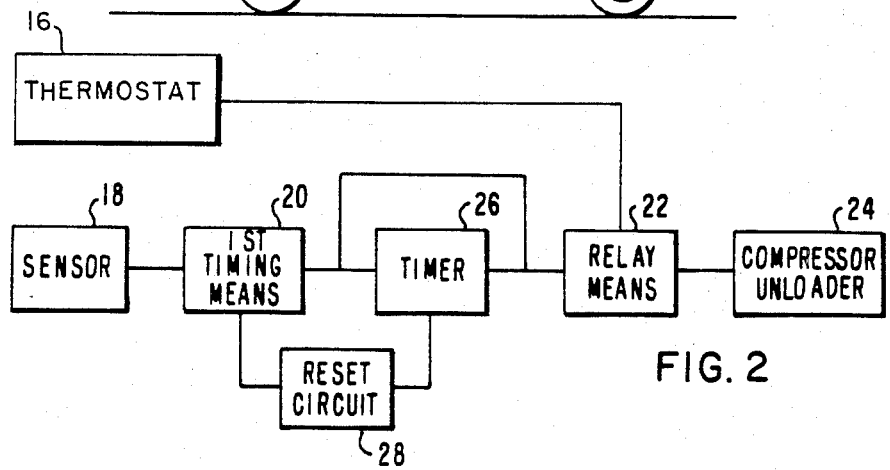
FIG. 2 is a block diagram of a control arrangement to carry out the invention.

The basic scheme of the invention is illustrated in block diagram form in FIG. 2 and includes the sensor 18 for sensing the temperature of the discharge air and providing a signal reflecting that temperature, a first timing means 20 actuated by the signal and operable in response to the signal indicating a discharge temperature below a predetermined temperature capable of causing top freezing after a given period to provide time periods of progressively shorter duration, with progressively lower sensed temperatures. When the timing means 20 has accumulated a given number of pulses, relay means 22 for effecting unloading of the compressor through compressor unloader 24 is actuated, as well as duration timing means 26 which times the duration of the reduced refrigerating capacity. Upon the expiration of the time by timer 26, the relay 22 is actuated to go to a normal refrigerating capacity, and through a reset circuit 28 the timing means 20 is enabled to again begin counting if the discharge temperature is in a range which calls for the count.

Figure 3:
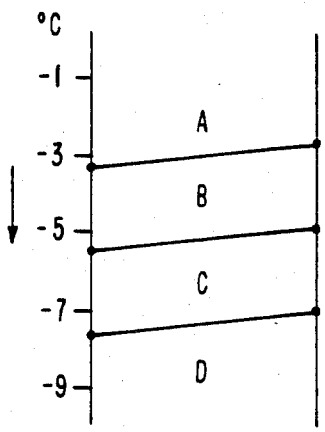
FIG. 3 is a representation for the purposes of explaining timer and counter operation with different falling and rising air discharge temperatures from the unit.

FIG. 3 represents an example of how the system may be set to operate with various temperatures in degrees centigrade of the discharge air, with the temperatures falling on the left hand side of the representation and rising on the right hand side. The temperature selected at which changes in timing occurs are selected for purposes of example only, and the particular periods of time for a timer to time out are also for purposes of example. Also, the number of areas given the latter designations are also somewhat arbitrary, with a greater number of such areas giving somewhat more precise control. Such preciseness of control is not usually considered necessary to adequately preclude a top freezing condition.

With a falling discharge air temperature above about −3.5° C., the top freeze avoidance system is off. This corresponds to the area having the letter designation A. As the temperature drops below about −3.5° C., the timer 20 is actuated and will accumulate time at a rate of about 60 minutes to time out, the area B indicating this functioning of the timer. If during this period the temperature fails to drop below about −5.5° C., the timer 20 will time out and actuate the relay 22 to obtain reduced refrigerating capacity. If prior to the expiration of the 60 minutes the discharge air temperature drops below about −5.5° C., the timer 20 will speed up its count to a rate of about 35 minutes to time out, the first speeded up rate period corresponding to the area C. If the timer has failed to time out in either area B or C and the discharge air temperature drops to about −8° C. or less, the timer 20 will accumulate time at a rate of 15 minutes to time out, this second speeded up timing corresponding to the area D. In each case as the temperature descends from the B to the D level, the previously accumulated time is kept and will be added to the speeded up count. The same situation prevails with rising temperatures with accumulated time being kept and counting slowed down in moving from one letter area to another. If the temperature should rise from the B to the A area before the timer has timed out, the timer will be turned off and all accumulated time will be cleared. In the currently preferred embodiment, the duration timer 26 functions for a fixed time to have the refrigerating system operate at a reduced capacity and keeping the timer 20 off during this period.

Figure 4:
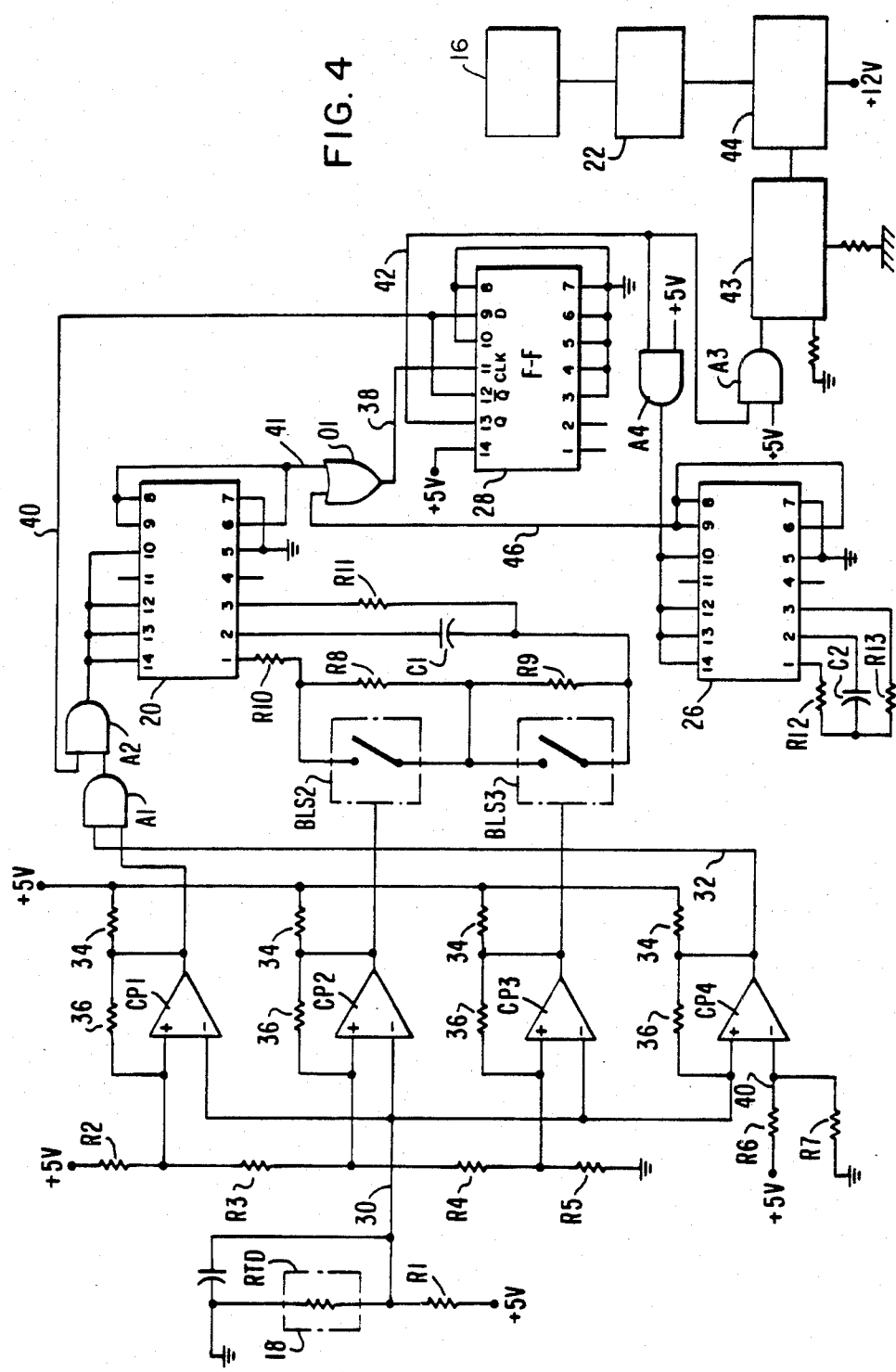
FIG. 4 is a schematic diagram of one particular control circuit arrangement capable of carrying out the invention, and developed by the applicant of the noted cross-referenced application.

FIG. 4 is a schematic of one particular control arrangement developed by the applicant of the cross-referenced application. RTD, standing for a resistance temperature device, is a positive temperature coefficient resistance which is positioned in the discharge air outlet as indicated by numeral 18 in FIG. 1 and is thus responsive to the discharge air temperature. For purposes of the embodiment to be described herein, the RTD may be a model S400 of Minco Products, Inc., and has a resistance of about 792 ohms at −20° F. (−29° C.) and a resistance of about 1025 ohms at 80° F. (26° C.). The approximate temperature values selected at which the timer is to begin counting is about 26° F. (−3.3° C.) and with the counting speeded up at approximately 22° F. (−5.6° C.) and speeded up further at 18° F. (−7.8° C.). Thus, the resistance R1 in the first voltage divider comprising RTD and R1 is selected, in accordance with the resistances R2-5 in the second voltage divider network providing reference signals, so that with a falling temperature the analog signal of line 30 and received by CP1 will switch CP1 on with the discharge air temperature sensed by RTD falling to 26° F. (−3.3° C.) or below. Likewise, when the analog signal from the first voltage divider is of a value corresponding to a falling temperature of the discharge air flow of 22° F. (−5.6° C.), comparator CP2 will change state, and with CP3 changing state when the analog signal corresponds to a falling discharge air temperature of 18° F. (−7.8° C.) or below. Since the system functions in the relatively narrow range of about 8° F. (4.4° C.) the resistors R3 and R4 are selected to have very low resistance values as compared to resistors R2 and R5.

CP4 is for the purpose of monitoring the sensor RTD to ensure that the system will be prevented from working if RTD is shorted. This is accomplished by providing an analog signal through the line 30 to the positive terminal of CP4 and by providing a reference signal from the bridge which includes R6 and R7 with the latter resistor being of a relatively low value compared to the former resistor. If the sensor RTD is shorted, CP4 will go from one state to the other, as shown from high to low which will be fed through line 32 to AND gate A1.

The comparators, which may be MM74C909 quad comparators, are open collector devices which require pullup resistors 34. Feedback resistors 36 are also associated with each of the comparators to set the fixed hysteresis for the comparators.

In the illustrated arrangement, the analog signal from line 30 is fed to the negative terminals of comparators CP1–CP3 and the comparators go from low to high as the temperature drops to the temperatures noted in connection with each of the comparators.

It is noted that while CP4 will only work to disable the system if RTD is shorted, if RTD is open the system will also be disabled since this will correspond to a condition of a high temperature discharge air.

The outputs of CP2 and CP3 are connected to and control the functions of bilateral switches BLS2 and BLS3, respectively, the switches selected for this particular control arrangement being CD4066BC quad bilateral switches. The switches are paralleled by resistors R8 and R9 with the common of BLS2 and R8 being connected to resistor R10, and the common of BLS3 and R9 being connected to resistor R11. Capacitor C1 also has one side connected to the common of BLS3 and R9.

The part of the circuit which basically performs the function of the variable timer 20, and which is so indicated in FIG. 4, is a CD4541BC programmable timer which can provide an oscillator, counter and flip-flop function in one integrated circuit. The frequency of the oscillator arrangement is determined by the resistor-capacitor network of R8–R11, C1, and the position of the switches BLS2 and 3. The input to the variable timer 20 is from the output of AND gate A2 and the output of the timer is to OR gate 01. With the particular timer selected, pins 12 and 13 of the timer determine the number of oscillations to count before the output at pin 8 changes state. Both pins 12 and 13 are high for the maximum count of 65536. Pins 9, 6 and 5 determine the state of pin 8 at initial start-up and after the predetermined count has been reached.

The reset arrangement includes a CD4013BC dual flip-flop and is also indicated by the numeral 28 in FIG. 4.

The fixed duration timer generally indicated 26 in FIG. 4 may be the same device as the variable timer 20.

The flip-flop is set up to change states at $\overline{Q}$ and Q when a positive clock pulse is received from the output of 01 through line 38. With initial power on, $\overline{Q}$ will be high and Q low. With $\overline{Q}$ high, the one terminal of AND gate A2 will be high through line 40. If the sensor RTD is not shorted, the input to AND gate A1 from line 32 will also be high. The other input of AND gate A1 will be low until the discharge air temperature reaches 26° F. (−3.3° C.) or less at which time the output of comparator CP1 goes high so that both of the inputs of AND gate A1 are high. Its output will then go high and at this time both inputs of AND gate A2 will be high and the output of A2 will power up the timer 20 and start the oscillator and internal counter. So long as the discharge air temperature remains in the B temperature range (FIG. 3), the oscillation frequency will be determined by all of the resistors R8–R11 and the capacitor C1. If the temperature should rise back into the A area of FIG. 3, the power will be removed from timer 20 and the oscillator will stop and the counter cleared.

If the discharge air temperature remains in the B area for a period of about one hour, the timer 20 will have timed out with the maximum number of counts of the timer. At this point, the output of the timer through line 41 to one input of OR gate 01 will go high and the flip-flop 28 will be clocked from the output of 01 through line 38. Q will go from low to high and feed that signal through line 42 to one terminal of AND gate A3, whose other terminal is already high. The A3 output is to an optoisolator 43 and a power Darlington transistor 44 which in turn connects to the relay coil 22. The opto-isolator and Darlington transistor are to provide for isolation between the 5 volt system of the logic circuit and the 12 volt system used to power the relays and other parts of the transport refrigeration system. The output to the relay 22 will cause it to switch to a position of reduced refrigerating capacity.

The output signal through line 42 also passes to AND gate A4, whose other input is connected to the supply voltage, so that A4 will go high and a fixed timer 26 will be started. At the same time that the fixed timer is started, the variable timer 20 will have power removed therefrom through $\overline{Q}$ going from high to low and causing AND gate A2 to go low.

The frequency of the fixed timer 26 is determined by the values of the RC oscillator circuit including resistors R12 and R13 and capacitor C2. As currently contemplated, the values of these components are selected to provide a time period for the fixed timer of about 30 minutes during which the transport refrigeration unit operates at a reduced refrigerating capacity. After the fixed timer has timed out, the output therefrom through line 46 to OR gate 01 which will again provide a signal through line 38 to clock the flip-flop and cause Q and $\overline{Q}$ to again change states to low and high, respectively, so that the relay 22 is operated to the normal refrigerating capacity position and variable timer 20 will be in a position to be again powered if the discharge air is still less than 26° F. (−3.3° C.), and the duration timer 26 will be turned off.

The same general sequence of events occurs, but with different timing depending upon whether CP2 and/or CP3 turn on due to sensed temperatures in the C and D range (FIG. 3). Thus, if in some period of time less than an hour the discharge air temperature has dropped to 22° F. (−5.6° C.) or less, CP2 will turn on and cause switch BLS2 to close, thereby shorting out resistor R8. This will speed up the count of the timer 20 in accordance with the reduction in resistance value of the R-C oscillator circuit and will cause the variable timer 20 to time out in some period less than an hour. Likewise, if before the variable timer 20 has timed out the temperature drops to 18° F. (−7.8° C.) or less, the count of the variable timer 20 will be further speeded up due to shorting out of the resistance R9.

It is claimed:

1. Control apparatus for reducing top freezing probability of fresh cargo adjacent the path of refrigerated air discharged from a transport refrigeration unit having normal refrigerating capacity in one mode, and reduced refrigerating capacity in another mode, comprising:

means for sensing the temperature of said discharge air and providing a signal reflecting that temperature;

timing means actuated by said signal and operable in response to said signal indicating a discharge temperature below a predetermined temperature capable of causing top freezing after a given period, to provide time periods of progressively shorter duration, with progressively lower sensed discharge air temperatures, of operation of said unit in said normal capacity mode;

means responsive to the expiration of any of said time periods to shift said unit to said reduced capacity mode; and thermostatic means for sensing the temperature of cargo air returning to said unit and for normally controlling said unit to a set point temperature.

2. The control apparatus according to claim 1 including:

means responsive to a rise of said discharge air temperature above said predetermined temperature, before the expiration of any of said time periods, to reset said first timing means.

3. The control apparatus according to claim 1 including:

said means to shift said unit to said reduced capacity mode includes second timer means operable to maintain said unit in said reduced capacity mode for a fixed time period irrespective of said discharge air temperature.

* * * * *